March 27, 1962   F. M. BRONSON ETAL   3,027,037
CONTAINER AND BOTTLE COMBINATION
Filed Feb. 23, 1960
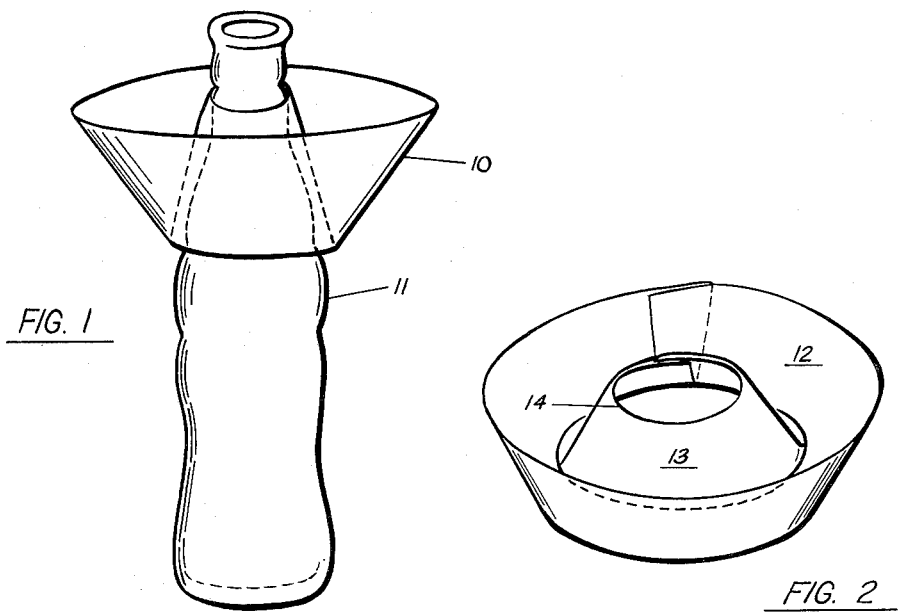
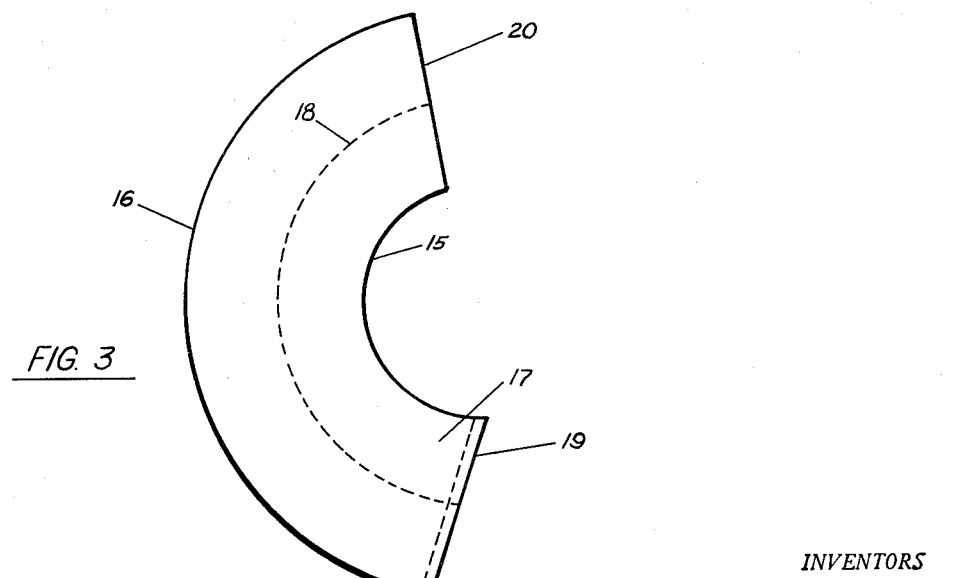
INVENTORS
Florence M. Bronson
BY Donald W. Gest
Charles L. Lovercheck
attorney 3,027,037
CONTAINER AND BOTTLE COMBINATION
Florence M. Bronson, 845 Napier Ave., and Donald W. Gest, 538 Smithson Ave., both of Lawrence Park, Erie, Pa.
Filed Feb. 23, 1960, Ser. No. 10,265
3 Claims. (Cl. 215—100.5)

This invention relates to containers and, more particularly, to containers for use on bottles and to containers in combination with bottles.

It is common practice to serve candy, nuts, cookies, potato chips, and the like with beverages served at parties. This usually necessitates a separate dish for containing the nuts, potato chips, etc. and, therefore, presents a problem.

It has been discovered that a convenient type of container can be provided for use in combination with a bottle which will eliminate the necessity of a separate container and provide a container supported on the bottle itself. The container can be readily removed from the bottle, either after its contents have been removed or while the bottle still includes its contents.

It is, accordingly, an object of the present invention to provide an improved container for use in combination with a bottle.

Another object of the invention is to provide an improved combination container and bottle.

Still another object of the invention is to provide an improved method of manufacture of a container or the like.

A further object of the invention is to provide a container which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of a container in combination with a bottle according to the invention;

FIG. 2 is an isometric view of the container removed from the bottle; and

FIG. 3 is a view of the sheet cut for forming the container.

Now with more specific reference to the drawing, a container 10 is shown supported on a bottle 11. The container 10 is made of generally an outer inverted frusto-conical shaped member 12 and an inner upright frusto-conical shaped member 13 having an opening at the small end adapted to receive the neck of a bottle. The apex end of the frusto-conical member 12 is integrally attached to the base section of the frusto-conical member 13.

An opening 14 is formed in the inner frusto-conical member 13 by removing a piece of material along a curved line 15 having edges generally concentric to an outer periphery 16 of a piece 17. A line 18 is scored intermediate the line 15 and the outer periphery 16 and generally concentric thereto.

It will be noted that the outer periphery 16 could be formed in a scalloped pattern or any other figured pattern to suit the individual taste of the user. Likewise, the curved line 15 could be formed scalloped or tiny figures could be formed thereon. Also, advertisements could be put on the container 10.

An edge 19 can be gummed or otherwise provided with adhesive material to attach it to an edge 20 to provide an attaching means or the device could be stapled together. This will cause the finished outside frusto-conical member 12 to take a flatter position.

The sheet itself may be made of tissue type paper so that the container itself can be utilized as a napkin as well as a container. The container can be made of any suitable material such as paper, plastic, or even metal.

It will be seen that when the improved container 10 is supported on a bottle as at 11, it will provide a convenient device which can be lifted off the bottle 11 and used as a separate dish. Further, the material thereof could be made of tissue so that it would serve the additional purpose of a napkin which may be discarded after use.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows.

We claim:

1. In combination, a bottle and a holder for articles supported thereon, said holder comprising a first frusto-conical shaped member made of a sheet of material, said member being open at its small end and adapted to receive the neck of said bottle with the inside sheet resting on said bottle, and a second frusto-conical shaped member made of sheet like material and having the apex end thereof attached to the base end of said first frusto-conical shaped member.

2. The combination recited in claim 1 wherein said second member is integral with said first member.

3. The combination recited in claim 2 wherein said holder is made of a segment of a disk shaped sheet having a hole cut from the center thereof.

References Cited in the file of this patent
UNITED STATES PATENTS

| | | |
|---|---|---|
| 1,127,480 | Maxwell | Feb. 9, 1915 |
| 2,038,576 | Krien | Apr. 28, 1936 |
| 2,552,051 | Margulies | May 8, 1951 |